(12) United States Patent
Kurtz et al.

(10) Patent No.: US 8,463,084 B2
(45) Date of Patent: Jun. 11, 2013

(54) OPTICAL MICROMACHINED PRESSURE SENSOR

(75) Inventors: Anthony D. Kurtz, Saddle River, NJ (US); Nora Kurtz, legal representative, Saddle River, NJ (US); Boaz Kochman, New York, NY (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 472 days.

(21) Appl. No.: 12/774,971

(22) Filed: May 6, 2010
(Under 37 CFR 1.47)

(65) Prior Publication Data

US 2010/0310207 A1    Dec. 9, 2010

Related U.S. Application Data

(63) Continuation-in-part of application No. 12/075,922, filed on Mar. 14, 2008, now Pat. No. 7,889,955, which is a continuation of application No. 11/014,007, filed on Dec. 16, 2004, now Pat. No. 7,440,645.

(51) Int. Cl.
*G02B 6/00*      (2006.01)

(52) U.S. Cl.
USPC .......................................................... 385/13

(58) Field of Classification Search
USPC .......................................................... 385/13
See application file for complete search history.

(56) References Cited

U.S. PATENT DOCUMENTS

| | | | |
|---|---|---|---|
| 4,899,042 A | | 2/1990 | Falk et al. |
| 5,128,535 A | * | 7/1992 | Bock et al. ............... 250/227.21 |
| 5,218,419 A | * | 6/1993 | Lipson et al. ................. 356/477 |
| 5,891,747 A | | 4/1999 | Farah |
| 5,891,751 A | | 4/1999 | Kurtz et al. |
| 6,788,417 B1 | * | 9/2004 | Zumberge et al. ............ 356/477 |
| 7,440,645 B2 | | 10/2008 | Kurtz et al. |
| 7,889,955 B2 | | 2/2011 | Kurtz et al. |
| 2003/0107095 A1 | | 6/2003 | Kurtz |
| 2003/0107096 A1 | | 6/2003 | Kurtz et al. |
| 2006/0023988 A1 | | 2/2006 | Kurtz et al. |
| 2008/0175529 A1 | | 7/2008 | Kurtz et al. |

OTHER PUBLICATIONS

Pavelescu, Ioan et al., "Analysis and Modelling of a Silicon Micromachined Mach-Zehnder Interferometer for Pressure Sensing", J. Micromech. Microeng. vol. 7, pp. 214-217, 1997.
Espinola, R.L. et al., "A Study of High-Index-Contrast 90° Waveguide Bend Structures", Optic Express, vol. 8, No. 9, pp. 517-528, Apr. 23, 2001.
Espinola, R.L. et al., "Fast and Low-Power Thermooptic Switch on Thin Silicon-on-Insulator", IEEE Photonics Technology Letters, vol. 15, No. 10, pp. 1366-1368, Oct. 2003.
Ahmad, R.U. et al., "Ultracompact Corner-Mirrors and T-Branches in Silicon-on-Insulator", IEEE Photonics Technology Letters, vol. 14, No. 1, pp. 65-67, Jan. 2002.

* cited by examiner

*Primary Examiner* — Uyen Chau N Le
*Assistant Examiner* — Hoang Tran
(74) *Attorney, Agent, or Firm* — Troutman Sanders, LLP; James E. Schutz; Jihan A. R. Jenkins

(57) ABSTRACT

It is an objective of the present invention to provide a highly sensitive optical pressure sensor that uses a Mach-Zehnder Interferometer to measure pressure. The pressure sensor comprises a deflectable diaphragm including a substantially central boss and channel and an optical waveguide having a first arm and a second arm, wherein the first arm is substantially aligned with an edge of the boss and the second arm is substantially aligned with an edge of the channel, and further wherein the first and second arms contain a periodic array of etched holes to improve the overall sensitivity of the pressure sensor. The pressure sensor further comprises a light source coupled to the optical waveguide for introducing light to the waveguide and a light detector coupled to the waveguide for detecting changes in the intensity of light. The change in light intensity is then correlated to an applied pressure.

10 Claims, 3 Drawing Sheets

OPTICAL MICROMACHINED PRESSURE SENSOR

RELATED APPLICATION

This application is a continuation-in-part claiming priority under 35 U.S.C. §120 to U.S. patent application Ser. No. 12/075,922, entitled "MICROMACHINED OPTICAL PRESSURE SENSOR," filed Mar. 14, 2008, which is not abandoned and is a continuation application claiming priority under 35 U.S.C. §120 to U.S. patent application Ser. No. 11/014,007, entitled "MICROMACHINED OPTICAL PRESSURE SENSOR," filed Dec. 16, 2004, now U.S. Pat. No. 7,440,645, issued on Oct. 21, 2008, all of which are incorporated by reference in their entirety as if fully set forth herein.

FIELD OF THE INVENTION

The present invention relates generally to pressure sensors and more particularly to an optical micromachined pressure sensor.

BACKGROUND OF THE INVENTION

Pressure sensors have achieved widespread acceptance for use in industrial applications. There are many pressure sensor variations, however most pressure sensors utilize some type of deflectable diaphragm that deflects when subjected to an applied pressure. Various techniques may be used to measure diaphragm deflection. For example, a strain gauge may be mounted to the diaphragm to provide an indication of deflection, or a piezoresistive capacitor may be used to measure deflection as deflection causes a change in capacitance. Nevertheless, pressure sensors come in many forms and may be tailored to meet specific needs of the industrial application.

An optical pressure sensor measures deflection caused by an applied pressure using an optical device, such as an interferometer. An interferometer measures light interference, which may be correlated to an applied pressure. Generally, an interferometer produces an input beam, splits it into two separate beams with a beam splitter, and recombines the beams on another beam splitter. Before recombining, each beam of light passes over a deflecting diaphragm, which creates interference and causes the power or the spatial shape of the beam to change. The interference of the recombined beam is then measured and correlated to an applied pressure.

Although there are many variations of optical pressure sensors, there is still a need in the art for highly sensitive optical pressure sensors that provide accurate pressure measurements. It is an object of the present invention to satisfy this need.

SUMMARY OF THE INVENTION

The various embodiments of the present invention provide an optical pressure sensor and method for making the same wherein the pressure sensor comprises a deflectable diaphragm having a substantially central boss and channel, an optical waveguide having a first perforated arm and a second perforated arm, wherein the first perforated arm is substantially aligned with an edge of the boss and the second perforated arm is substantially aligned with an edge of the channel. The pressure sensor further comprises a light source coupled to the optical waveguide for introducing light to the waveguide and a light detector coupled to the waveguide for detecting changes in the intensity of the light. The light source is split into two waveguides, the first and second arms, respectively. The arms are further adapted to compress and tense in accordance with the diaphragm deflection, therefore creating interference in the light source of each arm. The light then recombines at the other end of the pressure sensor and the light detector measures the change in interference, which is further correlated to an applied pressure The resultant device is a highly sensitive pressure sensor that uses interferometry to measure pressure.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical pressure sensing systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

According to an aspect of the present invention, an optical pressure sensor based on an interferometer may be provided and operated. For example, according to an aspect of the present invention, a Mach-Zehnder interferometer (MZI) may be used. For non-limiting purposes of explanation only, an MZI generally includes two Y-junctions that provide for an equal division of input optical power and subsequent recombination thereof. Without biasing, the input optical power is split into the two arms by the first Y-junction, and arrives at the second Y-junction in-phase for recombination. This provides a maximum signal intensity on the MZI waveguide output. However, when the MZI is biased, such as by using the electro-optic or piezo-optic effect, a differential phase change is induced across the arms of the MZI. Recombination of the injected signal by the second Y-junction thus causes constructive and/or destructive interference between the optical signals propagating down the two arms of the MZI. Thus, intensity of signals on the output waveguide is affected based upon biasing of the MZI. These output signals and their intensities may be measured using any suitable sensor, such as a photodiode, for example.

Figure 1:
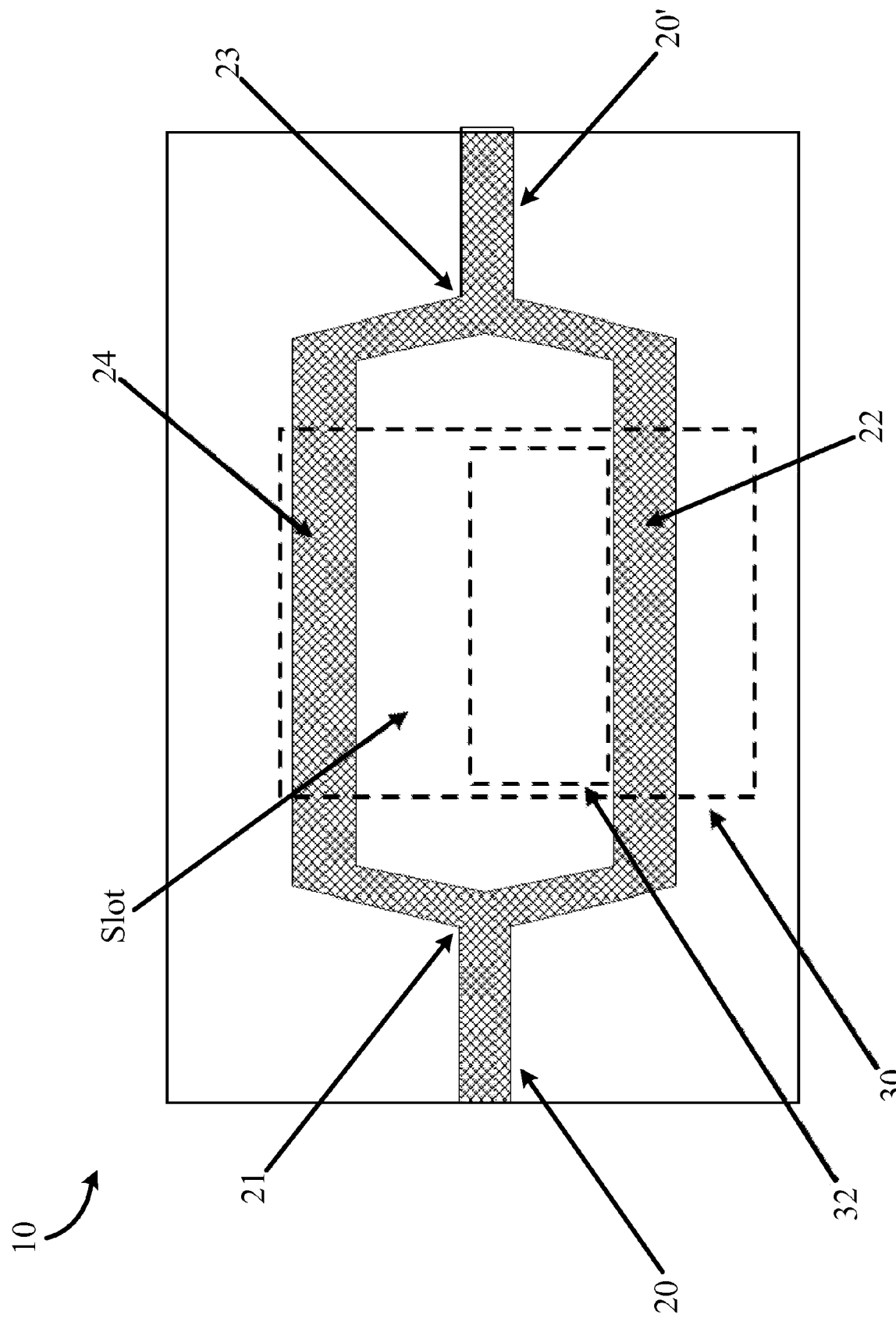
FIG. 1 is a plan view illustration showing a waveguide positioned over a deflecting diaphragm.

According to an aspect of the present invention, an optical pressure sensor based on a silicon micromachined Mach-Zehnder interferometer (MZI) may be provided and operated. Referring now to FIG. 1, there is shown a plan view illustration of a pressure sensor according to an embodiment of the present invention. The system 10 generally includes a waveguide 20 forming an MZI and a boss diaphragm 30.

Generally, the MZI may be used to determine the phase shift caused by a difference in the optical paths of two beams from a coherent light source, such as a laser. Waveguide 20 splits into two substantially parallel waveguides 22, 24 at a first Y-junction 21, and then recombines into a single waveguide 20' at a second Y-junction 23 some distance further along. In designs where the two arms 22, 24 of the interferometer are equal in length, the optical pathlengths are the same when the boss diaphragm 30 is unstressed. In this way, light propagating along waveguide 20 splits into the two arms 22, 24, and then recombines in-phase for maximum light output on waveguide 20'.

According to an aspect of the present invention, waveguide 20 may take the form of a silicon ridge waveguide surrounded, or cladded, by $SiO_2$. The light transmitting silicon may be made of any crystallographic orientation, which can be chosen in such a way to maximize the piezo-optic coefficient. Of course, other waveguiding material combinations may also be used. That being said, the present invention will be further discussed with regard to $Si/SiO_2$ waveguiding systems for non-limiting purposes of explanation only.

Because silicon is transparent to infrared light, an infrared light source, such as a laser having a central operating wavelength in the infrared range may be particularly well suited for use. For example, a laser system having a central wavelength between about 0.7 micrometers (μm) and about 350 μm may be suitable. By way of further example, an InGaAsP based laser operating at a central wavelength of about 1.55 μm may be well suited for use with the present invention.

The difference in index of refraction between the silicon waveguide and the $SiO_2$ confining layer(s) may be substantially large to cause strong confinement to the waveguiding core. For example, the difference in the refractive indices of the core and confinement layers (Δn) may be about 2, or even greater. By way of further, non-limiting example only, the refractive index of the core may be about 3.5 at an operating wavelength of about 1.55 μm, while the refractive index of the cladding layers may be about 1.5 at the same operating wavelength.

According to an aspect of the present invention, an about 12 μm wide single-mode striploaded waveguide having an about 0.3 μm thick silicon core positioned or cladded between $SiO_2$ cladding layers, all integrated with a silicon wafer, may be used. Of course, other waveguide configurations, such as ridge waveguides, may also be used. The lower cladding may be about 1 or 2 μm thick, and the upper cladding may be at least about 0.5 μm thick, for example.

A silicon-on-insulator (SOI), such as a silicon-on-oxide, structure may be used. A silicon layer over a $SiO_2$ containing structure may be patterned into the interferometer shape, so as to define waveguide 20 and arms 22, 24, for example. A layer of $SiO_2$ may be deposited over the patterned silicon or whole wafer, for example.

Conventional $Si/SiO_2$ processing techniques may be used to form the waveguiding MZI core and cladding structure. For example, the lower oxide cladding may take the form of a buried oxide layer produced over a silicon substrate by the Unibond technique, developed by Soitec. E-beam lithography may be used to define the MZI waveguide structure in poly(methyl methacrylate), which may be subjected to a lift-off process to provide an Al mask that may be used to reactive ion etch the silicon layer in a $CF_4:Ar_2$ (2:1) etching environment. A layer of $SiO_2$ may be sputtered over the resulting core and lower cladding structure. Input and output facets for the silicon waveguide may be provided. Alternatively, the MZI waveguide structure may be incorporated onto a larger Photonic Integrated Circuit (PIC) chip including a suitable optical signal source and/or sensor, such as a diode laser and photo-diode. Temperature compensation for one or more of the source, waveguide and detector may be provided for as well.

According to an aspect of the present invention, the silicon substrate may be selectively thinned to define the bossed diaphragm. The silicon substrate may be selectively thinned using any suitable technique, such as etching or micro-machining, both by way of non-limiting example only. Formation of the boss and surrounding channel may occur prior to or post waveguide processing. Alternatively, boss formation may occur substantially simultaneously with waveguide formation where wafer etching techniques are used, for example.

Figure 2:
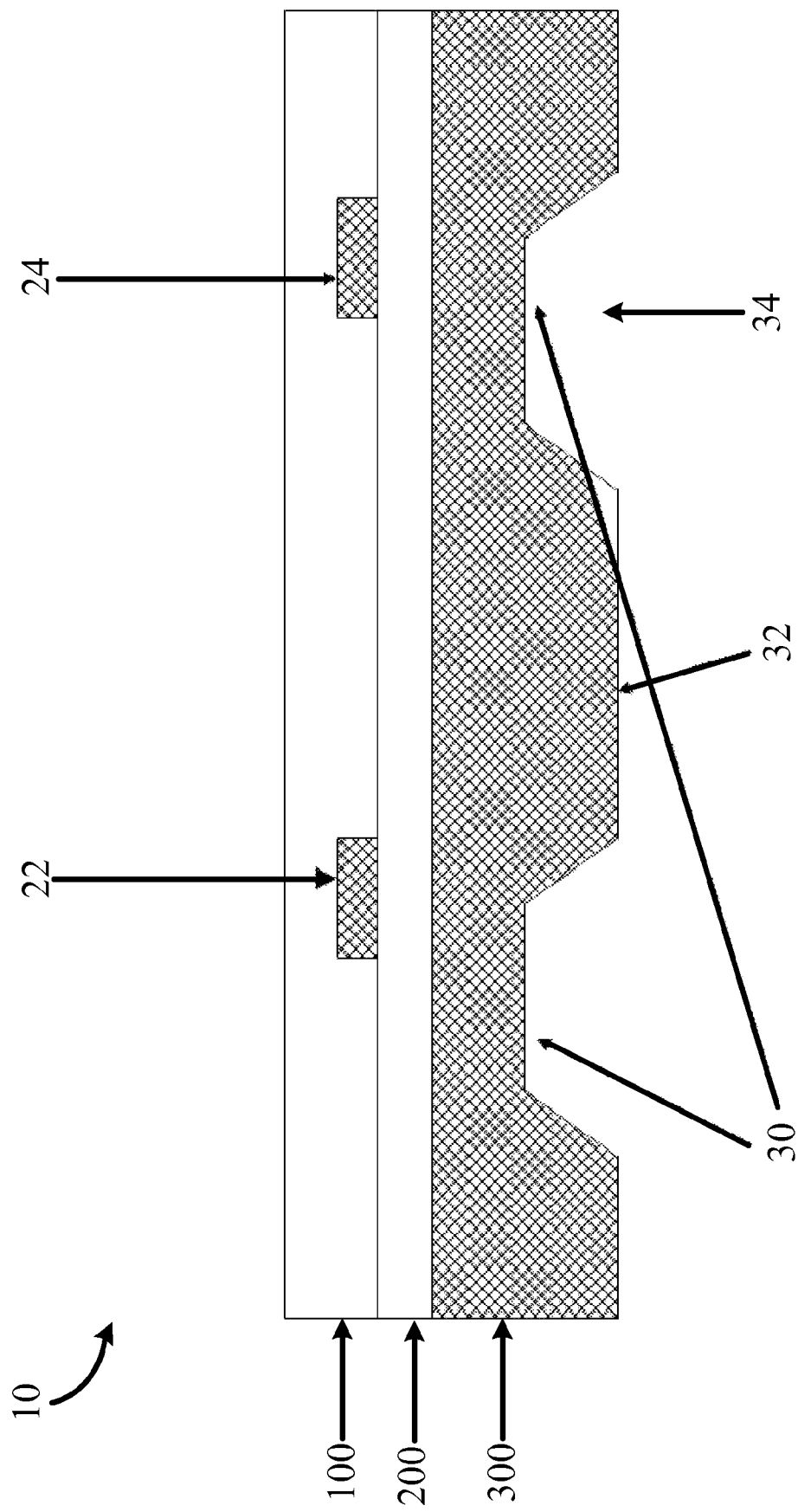
FIG. 2 is a cross-section illustration showing the deflecting diaphragm, the silicon core, and the $SiO_2$ cladding layers.

Referring now also to FIG. 2, there is shown a cross-section illustration according to an aspect of the present invention. Again, system 10 generally includes a waveguide 20 (arms 22, 24 being shown) cladded by upper and lower cladding layers 100, 200 and boss diaphragm 30 in supporting silicon substrate 300. As may be seen in FIGS. 1 and 2, boss diaphragm 30 generally includes a substantially central protuberance, or boss 32, surrounded by a relatively thinned channel 34. Boss diaphragm 30 may be formed of silicon. In general, the diaphragm may be made of (100) material, by way of non-limiting example.

One arm 22 of the interferometer may be placed near an edge of the boss 32. This arm 22 is stressed compressively when the diaphragm 30 is deflected or pressurized. The other arm 24 may be placed near an edge of the diaphragm 30, substantially corresponding to an outer edge of channel 34. This arm 24 is placed in tension when the diaphragm 30 is deflected. According to an aspect of the present invention, by using a boss and stressing each arm in opposite directions, twice the phase change can be achieved as compared to that of a single MZI sensing arm and MZI reference arm for a same diaphragm deflection. This may facilitate the use of thicker, less deformable diaphragms for a given pressure to be sensed as compared to a single MZI sensing arm and MZI reference arm configuration—as a greater phase change may be realized responsively to less deflection. This may advantageously provide for higher pressure sensing devices to be realized, and better device durability. Boss diaphragm 30 may also provide a stop for overpressure protection.

In other words, according to an aspect of the present invention a push-pull type configuration may advantageously be employed. By carefully positioning the interferometer arms with respect to the boss and diaphragm, the stress on the arms may be made to be equal in magnitude and opposite in sign. When the diaphragm 30 deflects, stress applied to the silicon core of the waveguide 20 arms 22, 24 causes a change in the index of refraction for light polarized in the direction of the stress consistent with the piezo-optic effect. Because the index of refraction of the two arms 22, 24 become unequal when the diaphragm is pressurized, the optical pathlength for light in the arms becomes unequal, which causes a phase difference as the optical signals recombine into waveguide 20'. In this way, the amount of interference, such as destructive interference, and thus the intensity of the light output from the interferometer varies with pressure. This intensity change, and hence the applied pressure, may be sensed using a sensor suitable for detecting the recombined signals, such as a photo-diode, for example.

The maximum amount of interference (ideally zero light output) occurs when the total phase difference is Π. However, since the stress applied to each branch is of opposite sign, the change in the index of refraction, and hence phase, is also of opposite sign. Thus, according to an aspect of the present invention, for a total phase difference of Π, the phase change for each branch or arm 22, 24 may be ±Π/2.

The phase change for each arm may be given by:

$$\Delta\Phi = \left(\frac{2\Pi\Delta n}{\lambda n}\right)L$$

where ΔΦ is the phase change, λ is the wavelength of the propagating light, Δn is the change in index of refraction, n is the unstressed index of refraction, and L is the length of the interferometer arms under stress.

The change of index of refraction due to the piezo-optic effect Δn may be approximated by:

$$\Delta n \approx C\sigma$$

where C is the piezo-optic coefficient and σ is the stress applied to the silicon core of the waveguide.

Consistently, one may design an interferometer and diaphragm combination to induce a maximum phase shift (zero light output) at a desired input pressure. For example, using a wavelength of 1.55 μm, and index of refraction of 3.5, a target stress of 20,000 PSI and a piezo-optic coefficient of $2\times10^{-12}$ cm²/dyne=$3.5\times10^{-8}$ PSI, one may calculate a length of the interferometric arms to be about 1,900 μm or about 75 mil.

Figure 3:
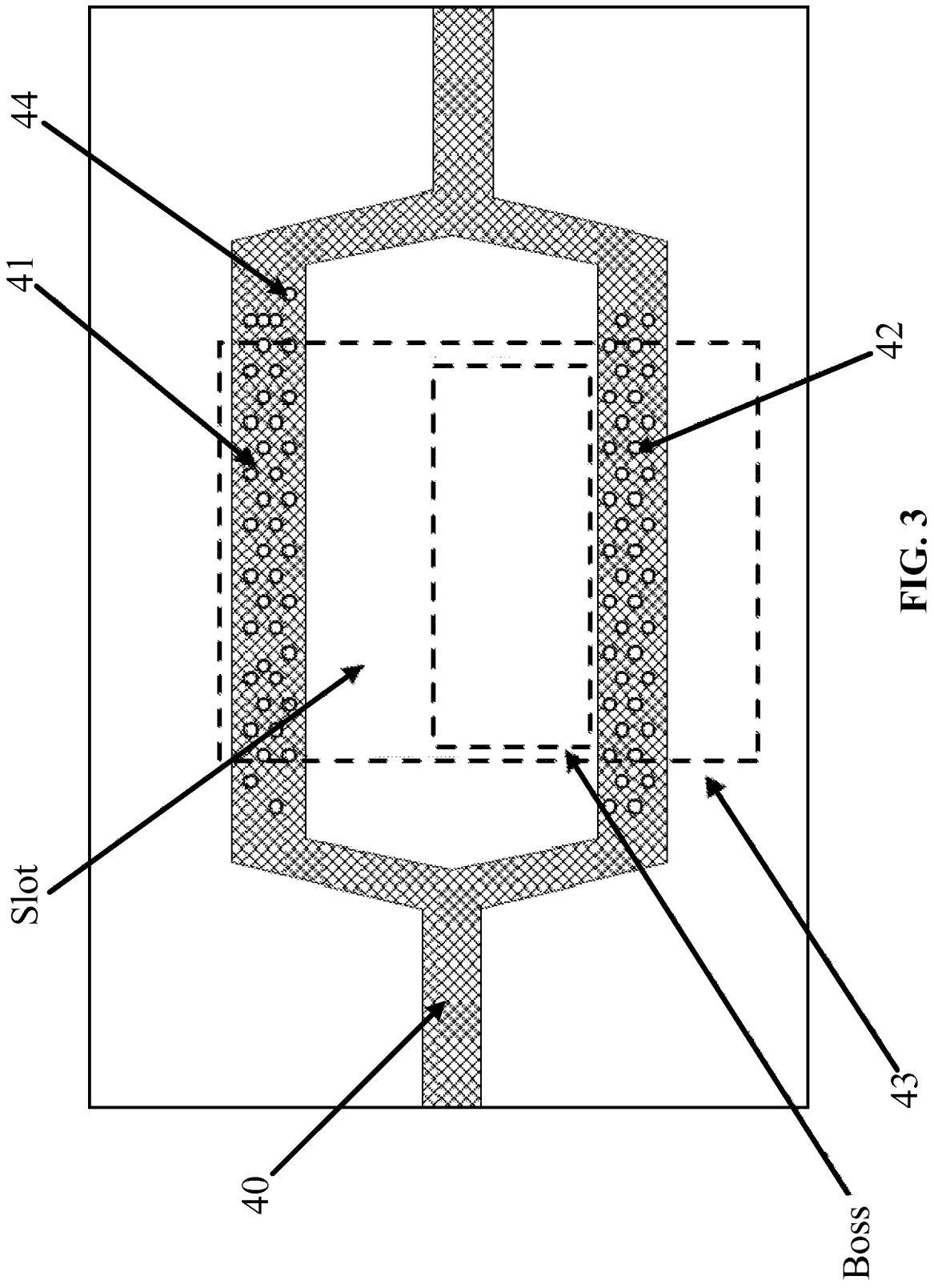
FIG. 3 is a plan view illustration according to an embodiment of the present invention showing a waveguide positioned over a deflecting diaphragm wherein the arms of the waveguide are perforated.

Further, one may design an interferometer and diaphragm combination that improves the overall sensitivity of the pressure sensor. FIG. 3 illustrates another preferred embodiment of the present invention. This particular interferometer and diaphragm combination further improves the overall sensitivity of the pressure sensor by etching a plurality of holes 44 in both arms 41, 42 of the waveguide 40. One skilled in the art will appreciate that etching holes 44 into the arms 41, 42 reduces the amount of material and therefore compromises the overall structural integrity of the arms 41, 42 making it easier for them to bend or fold upon an applied stress. Therefore, the amount of stress applied to the arms with holes 41, 42 from a given applied pressure is greater than it would be if applied to arms without holes, 22, 24, illustrated in FIG. 1. One skilled in the art will also appreciate that an increase in applied stress, σ, to the arms 41, 42 consequently increases the change of index refraction, Δn, which correspondingly increases the overall sensitivity of the pressure sensor. This phenomenon may be confirmed by the equation above, Δn≈Cσ. One skilled in the art will further appreciate that the piezo-optic coefficient, C, is different for the arms with holes 41, 42 than it is for the arms without holes 22, 24.

Although the embodiment illustrated in FIG. 3 utilizes a plurality of holes 44 to reduce the amount of material on the arms 41, 42, the material may also be reduced in other ways. For example, the material on the arms may be made thinner, the spacing between holes may be decreased, and/or the size of the holes 44 may be increased. Further, although the holes illustrated in FIG. 3 are circular, one skilled in the art will appreciate that many other geometric shapes may be used.

As previously mentioned, the primary purpose of the holes 44 is to impact the amount of stress applied to the arms 41, 42, therefore improving the sensitivity of the pressure sensor. However, the index of refraction may also be secondarily affected as a result of the holes. One skilled in the art will appreciate that manipulating the spacing between the holes and/or changing the size of the holes not only affects how material on the arms is reduced, but also affects the index of refraction as it will change the way light is refracted in both arms 41, 42 upon an applied stress. Manipulating the size and space between holes 44 can also affect which light wavelengths are absorbed and thus the holes 44 may be designed to act as a filter for unwanted light wavelengths.

Also illustrated in FIG. 3 is a diaphragm 43 comprised of a boss and a slot. Like the diaphragm illustrated in FIG. 2, the boss is a central protuberance surrounded by a substantially thinned channel, also known as a slot. The boss in this preferred embodiment works the same way as the boss 32 in the embodiment without holes and controls the maximum amount of stress. Contrastingly, the slot may be thinned accordingly to increase the overall sensitivity of the diaphragm 43 to pressure. The strategic placement of the arms 42, 43 over the diaphragm 43 enables a push-pull configuration to be employed such that the stress on the arms may be equal in magnitude and opposite in sign.

Additionally, the same materials used for the embodiments illustrated in FIG. 1 and FIG. 2 may be used for this embodiment. Specifically, the diaphragm may be made of silicon and the waveguide may comprise a silicon core and a $SiO_2$ cladding layer. However, other materials may also be used.

According to yet another aspect of the present invention, compact optical pressure sensors may be added to each pressure sensor configuration. As the length (L) of each of the arms in a sensor according to an aspect of the present invention contributes to the phase differential upon recombination, shorter arms may potentially be used as compared to a single MZI sensing arm/reference arm configuration where the length of only one arm contributes to the sensed change.

Further yet, although FIGS. 1 and 3 show the transmitting material, e.g., waveguide 20, 40, as a single straight line, other shapes, such as the resistor pattern shown in U.S. Pat. No. 5,891,751, the entire disclosure of which is hereby incorporated by reference as if being set forth in its entirety herein, may be used. For example, the use of such a pattern may provide for increased optical path lengths in the interferometer arms for a given chip size, as compared to straight arms. This may serve to provide higher sensitivity without increasing the size of the chip.

Such a configuration may be achievable through the use of highly confining silicon waveguiding cores and $SiO_2$ cladding. Further, corner mirrors may be well suited for use with the SOI material system of the present invention, to further facilitate the production of low-loss tortuous waveguides.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

The invention claimed is:

1. A pressure sensor comprising:
   a deflectable diaphragm comprising a first thinned channel and a second thinned channel surrounding a substantially central boss;
   an optical waveguide comprising first and second perforated arms positioned above the deflectable diaphragm, the first perforated arm being substantially aligned with an edge of said boss above the first thinned channel and the second perforated arm being substantially aligned with an edge of said second thinned channel;
   a light source coupled to said optical waveguide for introducing light to said waveguide; and
   a light detector coupled to said waveguide for detecting changes in the intensity of light.

2. The sensor of claim 1, wherein said first and second perforated arms comprise a plurality of etched holes.

3. The sensor of claim 1, wherein said waveguide comprises a silicon core.

4. The sensor of claim 3, wherein said waveguide further comprises a SiO2 upper cladding.

5. The sensor of claim 3, wherein said waveguide further comprises a SiO2 lower cladding.

6. The sensor of claim 1, wherein said waveguide further comprises a buried oxide layer.

7. The sensor of claim 1, wherein said boss comprises silicon.

8. The sensor of claim 1, wherein said boss is formed in a silicon substrate.

9. The sensor of claim 8, wherein said boss is micromachined from said silicon substrate.

10. The sensor of claim 1, further comprising at least one of an infrared signal source or an infrared signal detector.

* * * * *